US008788072B2

(12) United States Patent
Van Herk

(10) Patent No.: US 8,788,072 B2
(45) Date of Patent: Jul. 22, 2014

(54) METHOD AND APPARATUS FOR ALTERING THE BEHAVIOR OF A NETWORKED CONTROL SYSTEM

(75) Inventor: Robert Van Herk, Dordrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 622 days.

(21) Appl. No.: 13/058,044

(22) PCT Filed: Aug. 11, 2009

(86) PCT No.: PCT/IB2009/053524
§ 371 (c)(1),
(2), (4) Date: Feb. 8, 2011

(87) PCT Pub. No.: WO2010/018538
PCT Pub. Date: Feb. 18, 2010

(65) Prior Publication Data
US 2011/0144773 A1    Jun. 16, 2011

(30) Foreign Application Priority Data

Aug. 14, 2008   (EP) ..................................... 08105045

(51) Int. Cl.
    *G06F 19/00*          (2011.01)
(52) U.S. Cl.
    USPC ............................... 700/89; 700/19; 709/200
(58) Field of Classification Search
    USPC ......... 700/7, 17, 19, 23, 87, 89, 90, 188, 280; 709/200; 715/731, 961
    See application file for complete search history.

(56) References Cited

U.S. PATENT DOCUMENTS

| | | | | |
|---|---|---|---|---|
| 4,580,098 A | * | 4/1986 | Gluckstern et al. | ........... 324/307 |
| 6,035,266 A | * | 3/2000 | Williams et al. | .............. 702/188 |

(Continued)

FOREIGN PATENT DOCUMENTS

| | | |
|---|---|---|
| WO | 2006095317 A1 | 9/2006 |
| WO | 2008078245 A2 | 7/2008 |
| WO | 2008078286 A1 | 7/2008 |

OTHER PUBLICATIONS

Neugschwandtner, G.: "Towards Plug and Play In Home Building Automation Networks"; IEEE Conference On Emerging Technologies and Factory Automation (ETFA) 2006, IEEE, pp. 461-464.

*Primary Examiner* — Kidest Bahta
(74) *Attorney, Agent, or Firm* — Yuliya Mathis

(57) ABSTRACT

The invention relates to altering the behavior of a networked control system such as the integrating of a device such as a light unit or a light switch in a networked control system such as a networked lighting system. An embodiment of the invention provides a method for altering the behavior of a networked control system, which comprises several devices, wherein the method comprises the steps of—selecting an abstract control logic program from a list of several abstract control logic programs (SIO), —transmitting a message for requesting replies from devices (S 12), —waiting for receiving a reply from at least one device (S 14), —displaying the profile of at least one device of the devices (S 16), from which replies were received, —waiting for a selection of at least one device from the displayed profiles (S 18), —generating code establishing the behavior of the selected abstract control logic program for the selected one or more devices (S20), and—uploading the generated code to one or more devices in the networked control system such that the selected devices will behave according to the selected abstract control logic program (S22). The invention allows creating a behavior alteration procedure for a networked control system, which is very intuitive for users, who merely have to perform some easy and comfortable interactions such as selecting the abstract control logic program.

16 Claims, 3 Drawing Sheets

(56) References Cited

U.S. PATENT DOCUMENTS

| | | | |
|---|---|---|---|
| 6,167,319 A * | 12/2000 | Harris et al. ............... 700/86 |
| 6,205,362 B1 | 3/2001 | Eidson |
| 6,892,168 B2 * | 5/2005 | Williams et al. ............. 702/188 |
| 7,126,291 B2 * | 10/2006 | Kruse et al. ................. 315/316 |
| 7,221,110 B2 | 5/2007 | Sears et al. |
| 7,233,831 B2 * | 6/2007 | Blackwell .................... 700/17 |
| 8,035,320 B2 * | 10/2011 | Sibert ........................ 315/312 |
| 8,436,542 B2 * | 5/2013 | Middleton-White et al. 315/152 |
| 2002/0035404 A1 * | 3/2002 | Ficco et al. ................. 700/65 |
| 2003/0028260 A1 * | 2/2003 | Blackwell .................... 700/18 |
| 2005/0102040 A1 * | 5/2005 | Kruse et al. ................. 700/9 |
| 2006/0242200 A1 | 10/2006 | Horowitz et al. |
| 2007/0263379 A1 * | 11/2007 | Dowling ...................... 362/151 |
| 2007/0273307 A1 | 11/2007 | Westrick et al. |
| 2008/0265799 A1 * | 10/2008 | Sibert ........................ 315/292 |

\* cited by examiner

METHOD AND APPARATUS FOR ALTERING THE BEHAVIOR OF A NETWORKED CONTROL SYSTEM

FIELD OF THE INVENTION

The invention relates to altering the behavior of a networked control system such as integration of a device such as a light unit or a light switch in a networked control system such as a networked lighting system.

BACKGROUND OF THE INVENTION

Networked control systems are a ubiquitous trend in commercial, industrial and institutional business markets and also in consumer markets. Examples of networked control systems are building automation systems, e.g. for lighting, heating and ventilation or safety. A networked control system may consist of devices like light ballasts, switches, daylight or occupancy sensors, actuators or meters. The devices are preferably connected wirelessly, i.e. via RF (radio frequency) modules. In a networked control system of the Applicant, which is called Information Architecture, three different kind of codes exist:

all control logic that the networked control system runs as a whole; thus forming a distributed program; this consists of:

small parts of functionality that define behaviors, for instance switch controlling a lamp. These are called control logic programs (CLPs). All CLPs together form the complete distributed program executed by the networked control system; and small parts of control code that implement the CLPs on the devices. These are called executors.

The control logic consists of the CLPs, and each CLP is implemented in terms of the small parts control code.

Thus, the term CLP used herein and in the Information Architecture of the Applicant describes in general a behavior of devices of the networked control system, e.g. a switch controlling a light, and must not be understood as limited to the Information Architecture, but as describing an element of typical networked control systems. When a new or different behaviour for devices in the network should be defined, the distributed program the network is running should be altered accordingly, particularly a control logic program that is part of the distributed program must be replaced to replace a behaviour by a different behaviour, or a new control logic program must be added for integrating a behavior in the networked control system. However, in state-of-the-art systems like LonWorks™ adding or altering control logic to a running networked control system is a complex process, which requires a detailed technical understanding of the networked control system, which an average user usually does not have.

SUMMARY OF THE INVENTION

It is an object of the present invention to provide a method and an apparatus for altering the behavior of a networked control system, which make it easier and more comfortable for users to alter control logic in or to add control logic to a running networked control system.

The object is solved by the subject matter of the independent claims. Further embodiments are shown by the dependent claims.

A basic idea of the invention is to provide a list of abstract control logic programs (ACLPs) for user selection. An ACLP is abstracted from physical devices, but defined in terms of one or more device types, instances of which are required for instantiating the functionality, defined by the ACLP, in a networked control system. An example of an ACLP is a "staircase" lighting switch behavior in a lighting system. In order to be able to generate a CLP of this ACLP, the system requires two devices that instantiate a light switch interface and one device that instantiates a light unit interface. Thus, the concept of ACLPs makes it easier and more comfortable for users to alter the behavior of a networked control system, particularly to integrate a device in a networked control system, since a user only has to select an ACLP for the devices to be altered or integrated and is relieved from having a deeper technical understanding of the complex process of altering the behavior of the networked control system. Particularly, the selection of the ACLP allows automating the device integration process.

An embodiment of the invention provides a method for altering the behavior of a networked control system, which comprises several devices, wherein the method comprises the steps of selecting an abstract control logic program from a list of several abstract control logic programs, transmitting a message for requesting replies from devices, waiting for receiving a reply from at least one device, displaying the profile of at least one device (S16) of the devices, from which replies were received, waiting for a selection of at least one device from the displayed profiles, generating code establishing the behavior of the selected abstract control logic program for the selected one or more devices, and particularly as such generating executors, and uploading the generated code, particularly the generated executors, to one or more devices in the networked control system such that the selected devices will behave according to the selected abstract control logic program.

This method allows creating a procedure for altering the behavior of a networked control system, for example by altering the control logic program of a device or by integrating a new device in the network, which is very intuitive for users, who merely have to perform some easy and comfortable interactions such as selecting the abstract control logic program. This method is also cheap since it does not require hiring an installer of the networked control system. Also, a typical non-skilled house owner could use this method to alter devices and/or integrate new devices in her/his building automation system.

According to a further embodiment of the invention, the step of selecting an abstract control logic program may comprise displaying the list of several abstract control logic programs as text, animations, and/or icons on a graphical user interface, wherein each icon indicates type and properties of the device with a profile corresponding to the abstract control logic program indicated by the icon. This makes it yet easier for a user to select an abstract control logic program, since the user may see at a glance which abstract control logic program is suitable for a device.

According to a yet further embodiment of the invention, the step of selecting an abstract control logic program may comprise analyzing the selected abstract control logic program for devices, which are required for instantiating the abstract control logic program, and indicating the analyzed devices. Since an abstract control logic program is not limited to a certain device, but more related to a new functionality to be integrated in the networked control system or a functionality to be altered, wherein this new or altered functionality may be performed by one or more new devices, the analyzing and indication of the result of the analysis indicates to the user the required device for instantiating the abstract control logic program selected by the user. For example, when a user selects an abstract control logic program for "sunrise atmosphere in the morning", the analysis may result in that a color lighting unit and a switching clock for activating the color light unit at a certain time and to control the lighting color for sunrise feeling are required for instantiating this abstract control logic program. The user may see this analysis result and can decide whether to instantiate the abstract control logic program, if the required devices are available.

In a further embodiment of the invention, the step of selecting an abstract control logic program may further comprise selecting one or more of the indicated analyzed devices. This allows a user to control the behavior alteration process since she/he may select for example a new device which should be integrated in the networked control system. Thus, the user knows which device will be integrated and must be available and, furthermore, can bring a portable device which controls the integration process to the device's neighborhood in order to enable a quick integration.

In a further embodiment of the invention, the step of transmitting a message for requesting replies comprises transmitting the message via a radio frequency interface at a predefined power. By predefining the power, with which a request message is transmitted, only devices in the neighborhood of the transmitter may be queried. This can make the behavior alteration process faster since not all devices of a networked control system must be queried.

The step of transmitting a message for requesting replies may in a further embodiment of the invention comprise querying a read-only device type state variable from a device. The read-only device type state variable may be provided for the purpose of queries for integration of new devices in a networked control system.

According to a yet further embodiment of the invention, the step of transmitting a message for requesting replies may comprise querying available memory space from a device. Thus, it can be checked how much memory is available for instantiating the selected abstract control logic program. It should be noted that the instantiated abstract control logic program need not necessarily be stored in the device, for which it is intended. Instead, the instantiated abstract control logic program, which is a CLP or a set of executors, may be also stored on devices, which have enough memory available for storing the instantiated abstract control logic program.

In a further embodiment of the invention, the step of waiting for receiving a reply from at least one device may comprise waiting for a predefined time span and transmitting a further message for requesting replies from devices that match the selected abstract control logic program. The further message may be transmitted with an increased range compared to the previously transmitted message. Thus, more and more devices may be stepwise included in the querying range. The range may be increased for example by increasing the transmission power, if the request message is transmitted via a RF interface, or by allowing multi-hop networking, not only a single-hop networking, or by gradually increasing the number of hops the request message is transmitted over, i.e. in a first instance, a low number of hops, for example only 1 is allowed, and the maximum number of allowed hops is increased by for example 1 in every following request message.

An embodiment of the invention further provides that the receiving of a reply from a device may comprise a haptic, visual and/or audible signal of the device. For example, a device replying to the request message may indicate the replying by activating a light on the device, such as an operation indication LED, or by beeping. For example, a user can go with a remote control device through a list of devices that match a profile for a selected abstract control logic program and highlight one choice in this list; then the accompanying device may start blinking or beeping, so the user knows which one is selected.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention provides a computer programmed to perform a method according to the invention such as a PC (Personal Computer), which may be applied to be a part of the networked control system and configured to integrate new devices in the networked control system in a user friendly and comfortable way. The PC may for example use a wireless communication adapter to communicate with devices of the networked control system.

A further embodiment of the invention provides an apparatus for altering the behavior of a networked control system, which comprises several devices, wherein the apparatus comprises an user interface being adapted
to allow a user to select an abstract control logic program from a list of several abstract control logic programs,
to display a profile of at least one device of devices, from which replies to a request message were received, and
to allow the user to select at least one device from the displayed profiles,
a communication unit being adapted for transmitting the message for requesting replies from devices and for receiving a reply from at least one device,
a processing unit being adapted to generate code establishing the behavior of a selected abstract control logic program for selected one or more devices and to initiate the communication unit to upload the generated code to one or more devices in the networked control system such that the selected devices will behave according to the selected abstract control logic program.

The apparatus may be for example implemented as a portable device with a processor, a memory, a network card and stack that enables communication with the networked control system, a display such as a touch screen, and a few buttons. Such a portable device may be embodied as a remote control for a networked control system such as a complex lighting system in a building, with which a user may easily and comfortably integrate new devices such as lamps in the networked control system.

The apparatus may be in an embodiment of the invention being adapted to perform a method of the invention and as described above.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
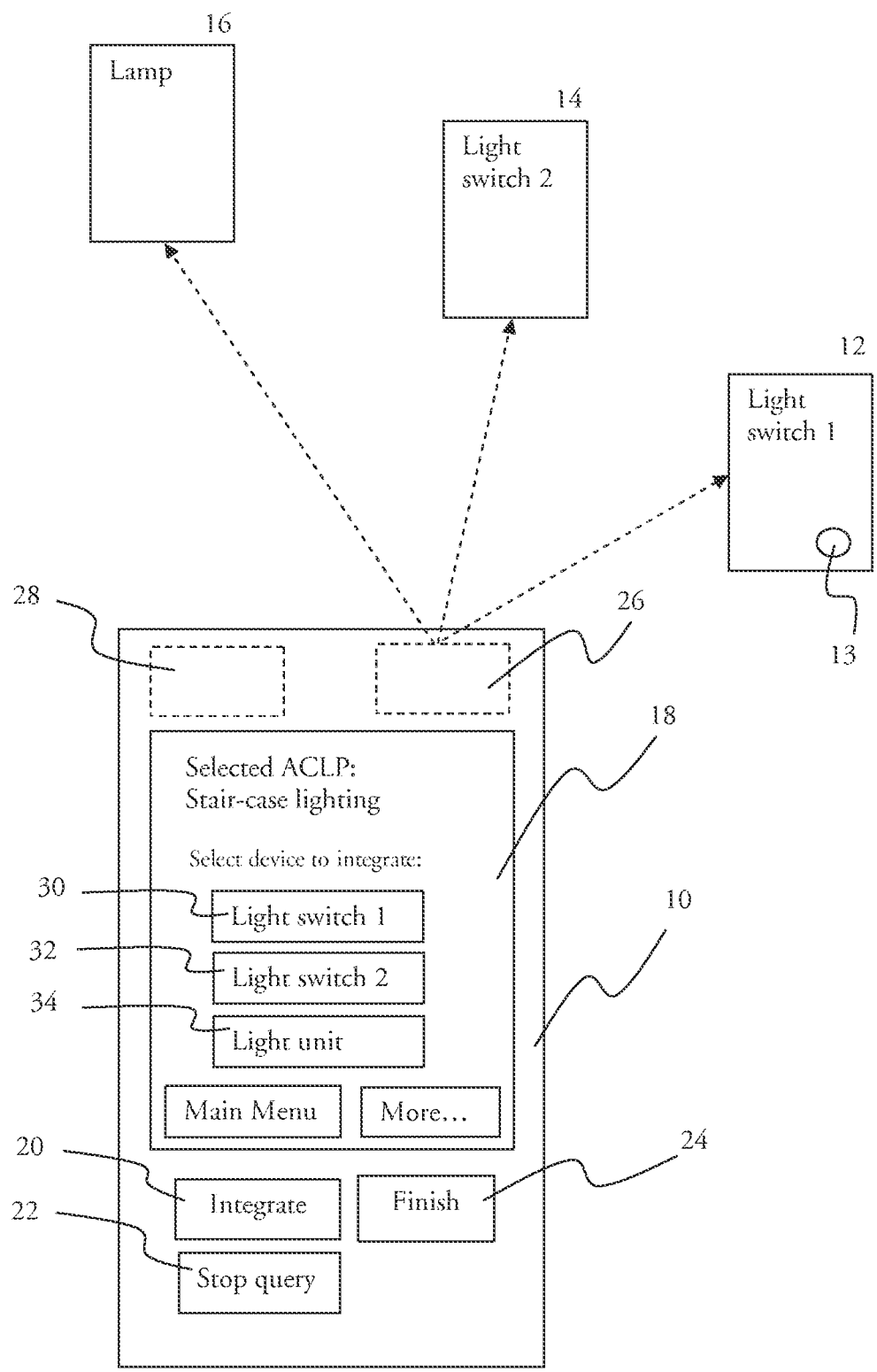
FIG. 1 shows an embodiment of an apparatus for integrating a device in a networked control system.

In the following, functionally similar or identical elements may have the same reference numerals.

The present invention provides a procedure that allows users to alter the behavior of a networked control system, for example to integrate a device in a networked control system by setting up new control logic for the device with little effort and no need for technical understanding. More concrete, the present invention intuitively incorporates functionality into the distributed program that a networked control system is running.

If control applications are added to a running networked control system by average users without deep technical understanding, special procedures are required. The present invention provides one that is flexible and very suitable for a networked control system. The proposed solution is very intuitive: a user may only point to where she/he wants the software to be installed;

cheap: a user don't need to hire an installer, but a typical non-skilled house owner could do it;

fast: a user don't need to hire an installer, so she/he can do it whenever she/he wants, any time of the day;

flexible: it allows to run any suitable logic for the new device to be integrated in the networked control system.

An embodiment of the invention is the Information Architecture (IA) of the Applicant, which is a networked control system with one or more devices, which:

can store (one or multiple) ACLPs that devices in the networked control system system can run;

the user can select one of these ACLPs;

the user can "point" and select devices in the networked control system (e.g. using proximity detection);

networked control system addresses and device type can automatically be extracted from these selected devices;

the selected ACLP can automatically be instantiated into a CLP for these devices;

executors, subscription tables and state variables can automatically be derived from this CLP (executors, subscription tables and state variables are IA terms);

they are subsequently automatically distributed and uploaded into the suitable devices.

Now, embodiments of the invention are explained in more detail and by means of examples. FIG. 1 shows a portable device 10 with a memory, for example (small) hard drive or memory card, a communication unit 26 with a network card and a stack that can communicate with networked control system, particularly with devices 12, 14, and 16 of the system, a touch screen display 18, and a few buttons 20, 22, and 24. The device 10 contains a processor 28, which executes an operating system software and software for implementing the integration of new devices in a networked control system. Various ACLPs are stored in the memory of this device 10.

In a networked control system, the devices in the network all have a device type (also called profile) that indicates which properties they have, e.g.: whether they are a light switch as devices 12 and 14 or a light unit or lamp as device 16, and which particular state variables they support. The ACLPs on the portable device are defined in terms of these profiles. The devices 12, 14 and 16 in the network are assumed to have a mechanism to send their own device types to the portable device 10, over their own network interface. A possible approach is to introduce a read-only DeviceType state variable on each device 12, 14, and 16 that can be queried.

Figure 2:
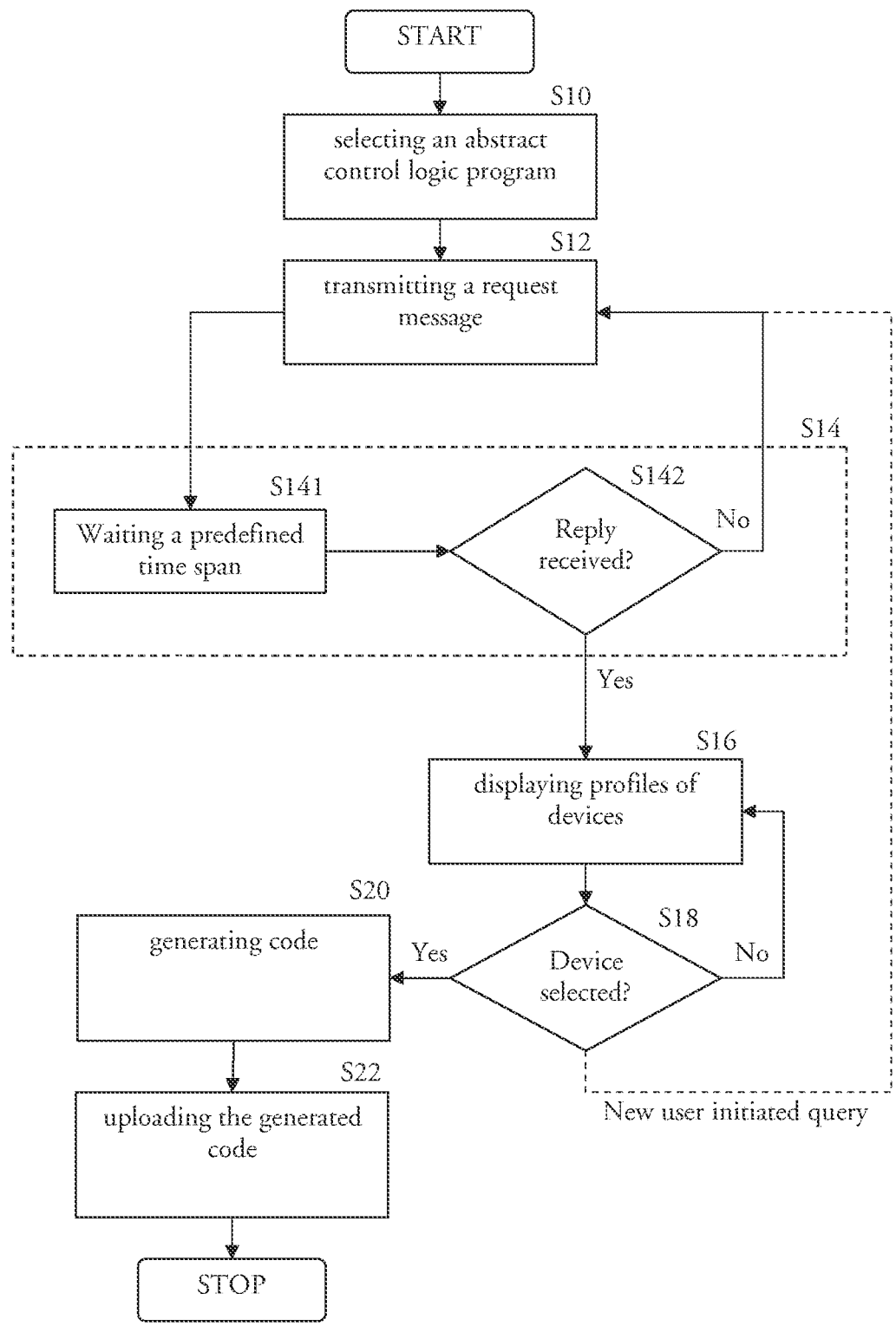
FIG. 2 shows a flowchart of an embodiment of a method for integrating a device in a networked control system according to the invention.

In the portable device 10, software is implemented, which performs a method for integrating the devices 12, 14 and 16 in the networked control system. FIG. 2 shows a flowchart of the software. The software may be started upon user interaction, for example when a user selects a button to start the integration of a new device in a running networked control system.

Suppose a user has bought two lighting switches 12 and 14 and one lamp 16 for installation in the staircase and integration in her/his building lighting system. The user wants to use both lighting switches 12 and 14 to operate the lamp 16 (i.e. "stair-case" lighting switch behavior). The user first installs the devices and establishes network communication in some way, for example by powering on the devices so that their network interfaces are ready for communication. It should be noted that the devices to be integrated in the networked control system for lighting in the house of the user are able to communicate wirelessly with other devices of the networked control system, and may comprise for this purpose for example ZigBee™ communication modules.

Figure 3:
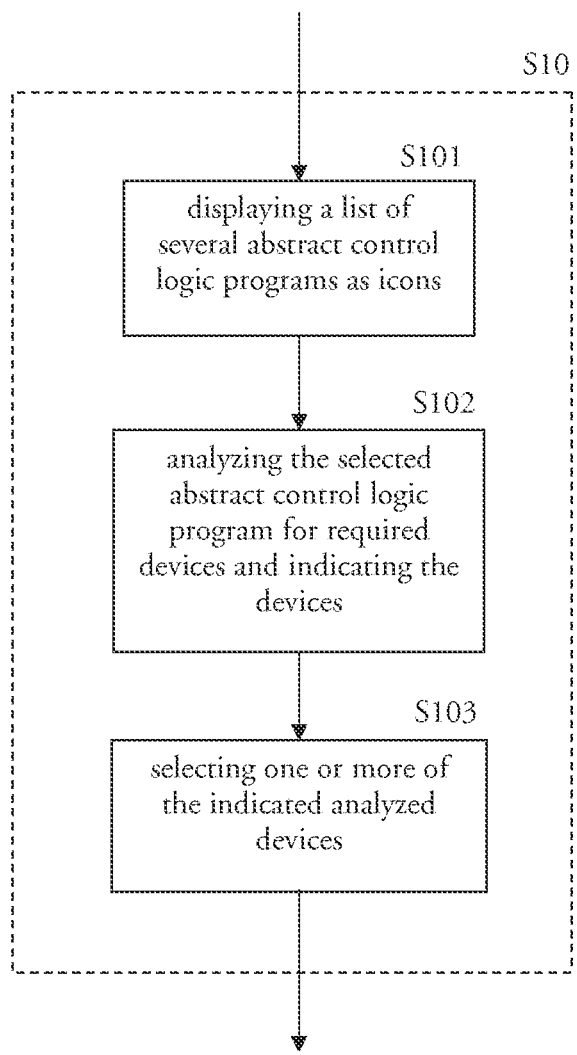
FIG. 3 shows one step of the flowchart of FIG. 2 in more detail.

For integration of the devices in the networked control system, the user takes her/his portable device 10 and selects the "Stair-case lighting" ACLP (step S10 in FIG. 2). This selection process is shown in more detail in FIG. 3: in step S101, a list of several ACLPs is displayed on the GUI, wherein each ACLP is represented by an icon related to the function of the ACLP. Then, in step S102, the ACLP, which was selected by the user, in the present example the "Stair-case lighting" ACLP, is analyzed by the software. As a result of the analysis, it is indicated to the user on the display 18, as shown in FIG. 1, that it needs two devices "Light switch 1" 30 and "Light switch 2" 32 that instantiate the light switch interface, and one device "Light unit" 34 that instantiates the light unit interface, in order to be able to make a CLP of the ACLP. On the display 18, the user may select one or more of the required devices by activating the buttons 30, 32, and/or 34 (step S103 in FIG. 3).

Then, the user takes her/his portable device 10 to a location near to the first lighting switch "Light switch 1" or device 12, and presses a button "Integrate" 20 on the device 10 that initiates a search for the devices, selected in step S103. Using the RF network card of the communication unit 26, the portable device 10 transmits a message that requests the devices in the neighborhood to send it their profiles (step S12 in FIG. 2). The message comprises identifications of the queried device types, which were selected in step S103, for example "Light switch" and "Light unit". All devices, even those already configured, may respond, to allow for system extensions. To only detect devices that are within its neighborhood, low power, and limited hop-count, for example single-hop networking may be used, so that devices that are further away will not receive the message. The user may be provided with a means to turn off or gradually decrease this restriction as far away devices may be involved. In extension, the user could instruct the portable device to search only for a particular type of device, e.g. the switches or the lamp (e.g. by clicking on an icon or part of the graphical ACLP representation, buttons 30, 32 and 34 in FIG. 1). This may be especially useful, if the actual device searched for is not easily reachable (e.g. thermostat hidden under the office desk) or is further than other devices (e.g. lamp in the ceiling).

After transmitting the request message, the method proceeds with waiting for replies from devices (step S14). First, the method waits a predefined time span, which may be adapted to the typical response time of devices (step S141).

Then, the method checks in step S142 whether a reply was received. If no reply was received, the method returns to step S12 for transmitting a further request message with increased transmission power in order to reach also devices, which have a greater distance to the portable device 10. It should be noted that the user also may "point" to the first lighting switch 12 (he places the antenna of the portable device 10 very near to it) in order to more quickly find the device 12. The user can also stop the search for devices by pressing the "Stop query" button 22 on the portable device 10.

If at least one reply for example from device 12 was received during the predefined time span the method proceeds with step S16. The portable device 10 shows the user the profile of the found device 12, and requests to confirm that this is one of the devices he wants to use. The user may confirm this by selecting the found device 12 with the touch screen display 18 of the portable device 10. If several devices were found, for example if replies from all of the devices 12, 14 and 16 were received, the found devices may be also shown on the display 18 of the portable device 10 and offered for selection by the user. In step S18, the method checks whether the user has selected the shown device. If not, the method returns to step S16 and shows a further device, from which a reply was received. If the user has selected the shown device on the touch screen display 18 of the portable device 10, the method may proceed with step S20 (see below). It should be noted that the user may also indicate that the wanted device was not found, and the method may restart the search using a higher power or with increased maximum number of hops with step S12 (indicated by the dotted line from step S18 back to step S12). Furthermore, it should be noted that found or replying devices may not only be shown on the display 18 of the portable device 10, but may also offer any feedback option (e.g. orange "visibility" LED or a beep tone). This further indication may be also instructed by the portable device 10 during the transmission of the request message, for example by incorporating a command in the message indicating to devices to enable any visual or audible feedback signalling, if a device replies to the request message (e.g. by blinking with the LED or beeping).

The portable device 10 now detects that it still needs one lighting unit 16 and one more light switch 14 from the ACLP, the user selected in step S10. Using the similar approach, the user may select the other devices as described above (steps S16 and S18) for instantiating the ACLP. Code for executing the CLPs will then be uploaded to devices in the network such that the selected devices will behave according to the just installed CLPs. It should be noted that in addition to querying the devices for their profiles and addresses, the portable device could also query them for the available program memory space. This may be especially important, when extending the existing system with new devices/functionality.

Finally, when the selection process is finished by the user, for example when all devices 12, 14, and 16 are selected, the user may click a "Finish" button 24 on the portable device 10. This triggers the portable device 10 to generate for each of the selected devices 12, 14, and 16 code establishing the behavior of the selected ACLP for the selected devices 12, 14, and 16 (step S20) and to upload the generated code (including required support logic like SV subscriptions) to the respective device 12, 14, and 16 (step S22). It should be noted that the generated code need not be necessarily uploaded to the selected devices but to any other device of the networked control system, which may cause the selected devices 12, 14, and 16 will behave according to the selected ACLP. The generation of code comprises parameterization with a physical device of the right type. The code can be transmitted at normal transmission power and does not require proximity of the device 10 to the selected devices, since their addresses are already known and the usual transport services of networking stack can be used. Now, the new program is installed on each selected device and the devices are part of the networked control system.

Alternative embodiments will be briefly explained in the following. The portable device could be split into a number of devices, e.g. one to select the lighting devices and one to do the instantiation and installation of the program. The latter one may be a central computer. Furthermore, if multiple devices are found with matching types that could be used to instantiate the ACLP on, the user can be offered the opportunity to select one. For example, if two light units are found (because they are near to each other), the portable device could show a selection dialogue to the user, and use a status indicator on the devices (e.g. a LED) that indicates which one is currently selected in the dialogue.

To make it possible to use the portable device from greater distance to the lighting devices, the portable device could first use reduced transmit power to find devices, and if none are found with the desired profiles, increasingly larger powers (to a certain maximum). Instead of using reduced power to send the device discovery messages, the portable device could also use multi-hop networking and round-trip-time to select the devices closest to the portable device (i.e. a timer could be used in the portable device to see which device answers first, and assume that one is nearest). Or, alternatively, multi-hop networking and hop-count (i.e.: see how many lighting devices are "in-between" the portable device and the target device, and select the devices for which this number is the smallest) could be used.

The invention can be used in any application in which the user wants to select nodes in network to deploy software on. Typically the invention may allow for hot plug and play and hot deployment of control logic programs, especially for networked control systems, e.g. for home and building automation.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention

The invention claimed is:

1. A method for altering the behavior of a networked control system, which comprises several devices, wherein the method comprises the steps of selecting an abstract control logic program from a list of several abstract control logic programs, transmitting a message for requesting replies from devices, waiting for receiving a reply from at least one device, displaying the profile of at least one device of the devices from which replies were received, waiting for a selection of at least one device from the displayed profiles, generating code establishing the behavior of the selected abstract control logic program for the selected one or more devices, and uploading the generated code to one or more devices in the networked control system such that the selected devices will behave according to the selected abstract control logic program, wherein the step of selecting an abstract control logic program comprises displaying the list of several abstract control logic programs as text, animations, and/or icons on a graphical user interface, wherein each icon indicates type and properties of the device with a profile corresponding to the abstract control logic program indicated by the icon.

2. The method of claim 1, wherein the step of selecting an abstract control logic program comprises analyzing the selected abstract control logic program for devices, which are required for instantiating the abstract control logic program, and indicating the analyzed devices.

3. The method of claim 2, wherein the step of selecting an abstract control logic program further comprises selecting one or more of the indicated analyzed devices.

4. The method of claim 1, wherein the step of transmitting a message for requesting replies comprises transmitting the message via a radio frequency interface at a predefined power and/or with an increased range compared to previously transmitted messages.

5. The method of claim 4, wherein the range is increased by at least one of increasing the transmission power, if the request message is transmitted via a RF interface, and allowing multi-hop networking, and gradually increasing the number of hops the request message is transmitted over.

6. The method of claim 1, wherein the step of transmitting a message for requesting replies comprises querying a read-only device type state variable from a device.

7. The method of claim 1, wherein the step of transmitting a message for requesting replies comprises querying available memory space from a device.

8. The method of claim 1, wherein the step of waiting for receiving a reply from at least one device comprises waiting for a predefined time span and transmitting a further message for requesting replies from devices.

9. The method of claim 1, wherein the receiving of a reply from a device comprises a haptic, visual and/or audible signal of the device.

10. An apparatus for altering the behavior of a networked control system, which comprises several devices, wherein the apparatus comprises:
 a user interface configured
  to enable a user to select an abstract control logic program from a list of several abstract control logic programs,
  to display a profile of at least one device of the devices, from which replies to a request message were received, and
  to enable the user to select at least one device from the displayed profiles,
 a communication unit being adapted for transmitting the message for requesting replies from devices and for receiving a reply from at least one device, and
 a processing unit being adapted to generate code establishing the behavior of a selected abstract control logic program for selected one or more devices and to initiate the communication unit to upload the generated code to one or more devices in the networked control system such that the selected devices will behave according to the selected abstract control logic program.

11. A method for altering the behavior of a networked control system of several devices, comprising:
 providing a display of a plurality of abstract control logic programs;
 receiving an indication of selection of a selected abstract control logic program from the display of the plurality of abstract control logic programs;
 transmitting a message for requesting replies from devices,
 waiting for receiving a reply from at least one device,
 determining the at least one device is associated with the selected abstract control logic program;
 displaying a profile of the at least one device,
 receiving an indication of selection of the at least one device from the displayed profile,
 determining code establishing the behavior of the selected abstract control logic program for the selected at least one device, and
 uploading the code to one or more devices in the networked control system such that the selected at least one device will behave according to the selected abstract control logic program.

12. The method of claim 11, wherein determining the at least one device is associated with the selected abstract control logic program includes:
 determining the device is of a type required for instantiating the selected abstract control logic program.

13. The method of claim 11, wherein transmitting the message for requesting replies comprises transmitting the message with an increased range compared to a preceding transmitted message requesting replies from devices.

14. The method of claim 13, wherein the range is increased by one of increasing the transmission power and increasing the number of hops the request message is transmitted over.

15. The method of claim 11, wherein providing the display of the plurality of abstract control logic programs includes providing the abstract control logic programs as text, animations, and/or icons on a graphical user interface.

16. The method of claim 11, wherein the receiving of a reply from a device comprises a haptic, visual and/or audible signal of the device.

* * * * *